(12) United States Patent
Takahashi et al.

(10) Patent No.: US 10,281,333 B2
(45) Date of Patent: May 7, 2019

(54) INFRARED SENSOR

(71) Applicant: Panasonic Intellectual Property Management Co., Ltd., Osaka (JP)

(72) Inventors: Kouhei Takahashi, Osaka (JP); Takashi Kawasaki, Osaka (JP); Yasuyuki Naito, Osaka (JP); Morio Tomiyama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/497,353

(22) Filed: Apr. 26, 2017

(65) Prior Publication Data
US 2017/0356806 A1 Dec. 14, 2017

(30) Foreign Application Priority Data
Jun. 13, 2016 (JP) .................. 2016-116747

(51) Int. Cl.
| G01J 5/02 | (2006.01) |
| G01J 5/14 | (2006.01) |
| G01J 5/22 | (2006.01) |
| G01J 5/20 | (2006.01) |
| G01J 5/12 | (2006.01) |

(52) U.S. Cl.
CPC . *G01J 5/02* (2013.01); *G01J 5/12* (2013.01); *G01J 5/14* (2013.01); *G01J 5/20* (2013.01); *G01J 5/22* (2013.01); *G01J 2005/123* (2013.01)

(58) Field of Classification Search
CPC .... G01J 5/12; G01J 5/0853; G01J 5/20; G01J 5/10; G01J 5/02; G01J 2005/063; G01J 2005/106; G01J 2005/126; G01J 2005/202; G01J 5/0205; G01J 5/022; G01J 5/22; G01J 5/14; G01J 2005/123
USPC ...................................... 250/338.3
See application file for complete search history.

(56) References Cited

U.S. PATENT DOCUMENTS

| 6,100,463 A * | 8/2000 | Ladd ............... H01L 35/34 |
| | | 136/201 |
| 7,309,830 B2 * | 12/2007 | Zhang .............. H01L 35/16 |
| | | 136/205 |
| 7,825,324 B2 * | 11/2010 | Hodes ............... F25B 21/02 |
| | | 136/208 |

(Continued)

FOREIGN PATENT DOCUMENTS

JP   2012-063359   3/2012

OTHER PUBLICATIONS

Author: Kory Forrest Gray Title: A MEMS Infrared Thermopile Fabricated from Silicon-On-Insulator with Phononic Crystal Structures and Carbon Nanotube Absorption Layer, Date: Mar. 29, 2016, Publisher: NCSU.*

(Continued)

*Primary Examiner* — Taeho Jo
(74) *Attorney, Agent, or Firm* — McDermott Will & Emery LLP

(57) ABSTRACT

An infrared sensor is formed in such a manner that an infrared receiver and a base substrate are spaced with a beam made of a thin-film phononic crystal in which through holes are arranged periodically. The beam made of a phononic crystal is formed in such a manner that a period P of through holes increases at arbitrary intervals in a direction from the infrared receiver toward the base substrate.

9 Claims, 12 Drawing Sheets

(56) References Cited

U.S. PATENT DOCUMENTS

| | | | | |
|---|---|---|---|---|
| 7,836,566 B1* | 11/2010 | Olsson | | G10K 11/20 |
| | | | | 29/25.35 |
| 8,094,023 B1* | 1/2012 | El-Kady | | G08B 13/14 |
| | | | | 340/539.1 |
| 8,508,370 B1* | 8/2013 | El-Kady | | G08B 13/14 |
| | | | | 340/568.1 |
| 9,324,733 B2* | 4/2016 | Rogers | | H01L 21/8258 |
| 9,696,492 B1* | 7/2017 | Cox | | G02B 6/1225 |
| 2006/0118158 A1* | 6/2006 | Zhang | | H01L 35/16 |
| | | | | 136/205 |
| 2008/0173344 A1* | 7/2008 | Zhang | | H01L 35/16 |
| | | | | 136/238 |
| 2009/0114819 A1* | 5/2009 | Yamanaka | | G01J 5/10 |
| | | | | 250/338.4 |
| 2009/0295505 A1* | 12/2009 | Mohammadi | | H01L 41/107 |
| | | | | 333/191 |
| 2011/0128094 A1* | 6/2011 | Huang | | H03H 9/02338 |
| | | | | 333/186 |
| 2011/0175145 A1* | 7/2011 | Tsuji | | G01J 5/02 |
| | | | | 257/252 |
| 2012/0061569 A1* | 3/2012 | Noguchi | | G01J 5/024 |
| | | | | 250/338.3 |
| 2013/0075699 A1* | 3/2013 | Brown | | B82Y 30/00 |
| | | | | 257/21 |
| 2013/0187169 A1* | 7/2013 | Taylor | | H01L 21/28506 |
| | | | | 257/76 |
| 2013/0206989 A1* | 8/2013 | Zhou | | G01J 5/0235 |
| | | | | 250/338.1 |
| 2013/0255738 A1* | 10/2013 | Mitrovic | | H01L 35/26 |
| | | | | 136/200 |
| 2015/0015930 A1* | 1/2015 | Hussein | | G02B 1/002 |
| | | | | 359/240 |
| 2016/0065169 A1* | 3/2016 | Rinaldi | | G01J 5/046 |
| | | | | 250/338.3 |
| 2016/0093420 A1* | 3/2016 | Urzhumov | | H01B 12/02 |
| | | | | 505/150 |
| 2016/0153837 A1* | 6/2016 | Kakimoto | | G01J 5/045 |
| | | | | 250/338.3 |
| 2016/0211828 A1* | 7/2016 | Simmonds | | G02B 6/1225 |
| 2016/0245696 A1* | 8/2016 | Shibayama | | G01J 3/26 |
| 2017/0069818 A1* | 3/2017 | Mitrovic | | H01L 35/26 |

OTHER PUBLICATIONS

M. Nomura et al., "Impeded thermal transport in Si multiscale hierarchical architectures with phononic crystal nanostructures" Physical Review B 91, 205422, May 15, 2015.

Jia-Hong Sun et al., "A Lamb Wave Source Based on the Resonant Cavity of Phononic-Crystal Plates," IEEE Transactions on Ultrasonics, Ferroelectrics, and Frequency Control, vol. 56, No. 1, Jan. 2009, pp. 121-128.

Peng Li et al., "Temperature insensitive mass sensing of mode selected phononic crystal cavity," J. Micromech. Microeng. 25 (2015), 125027, pp. 1-8.

\* cited by examiner

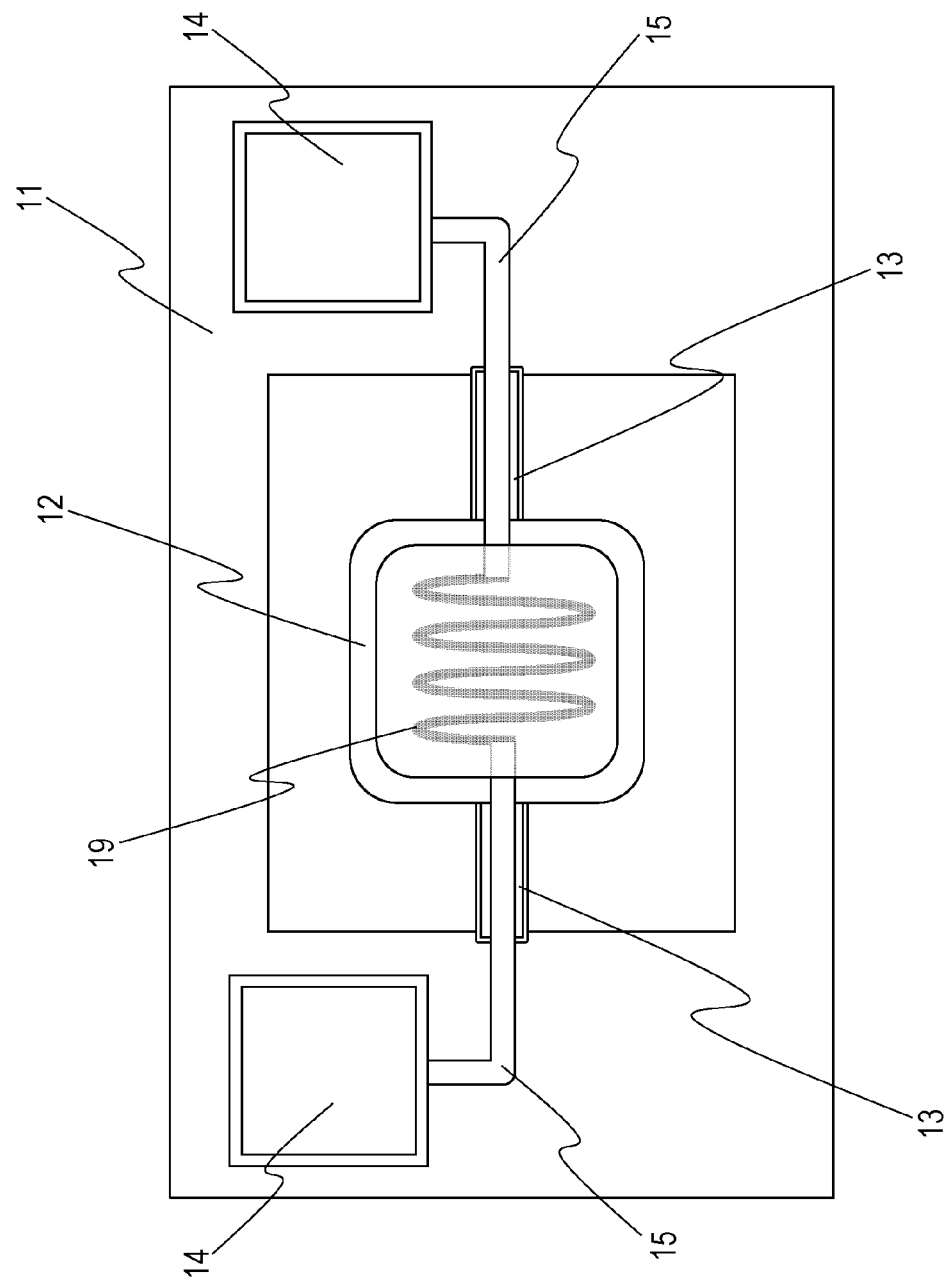

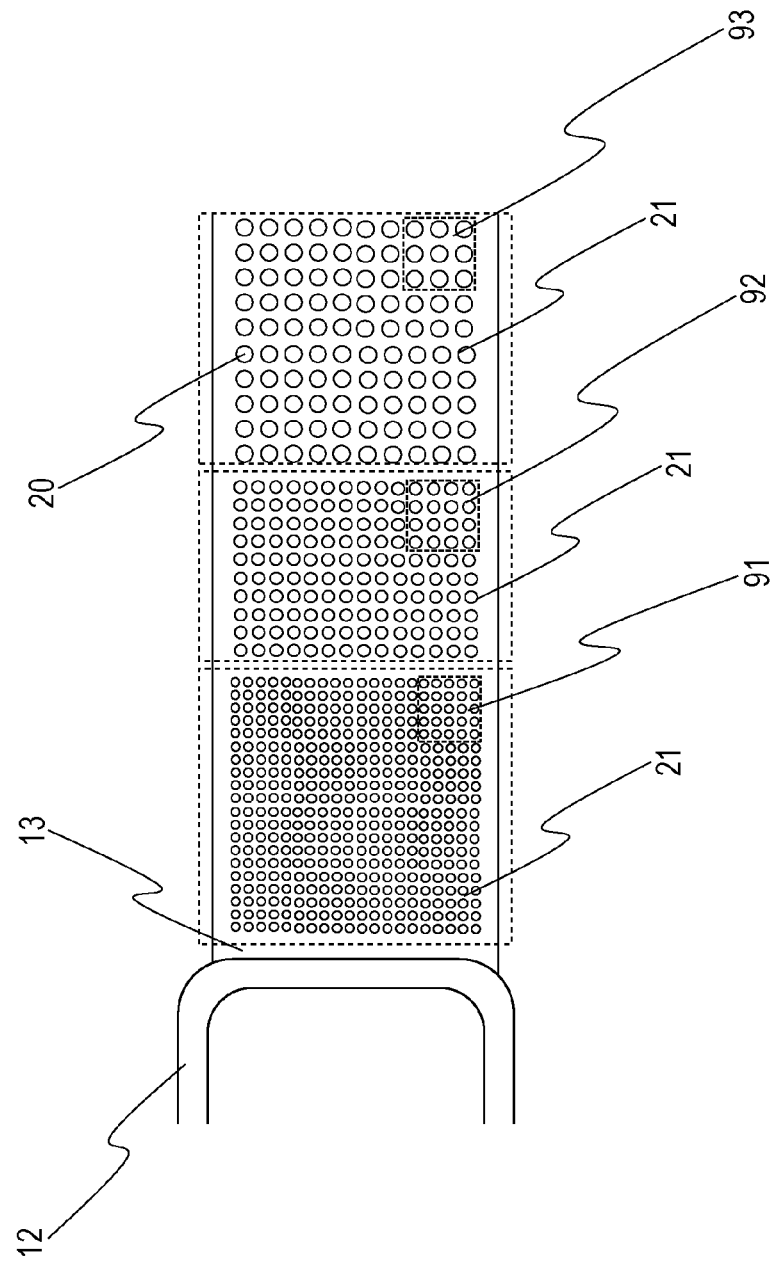

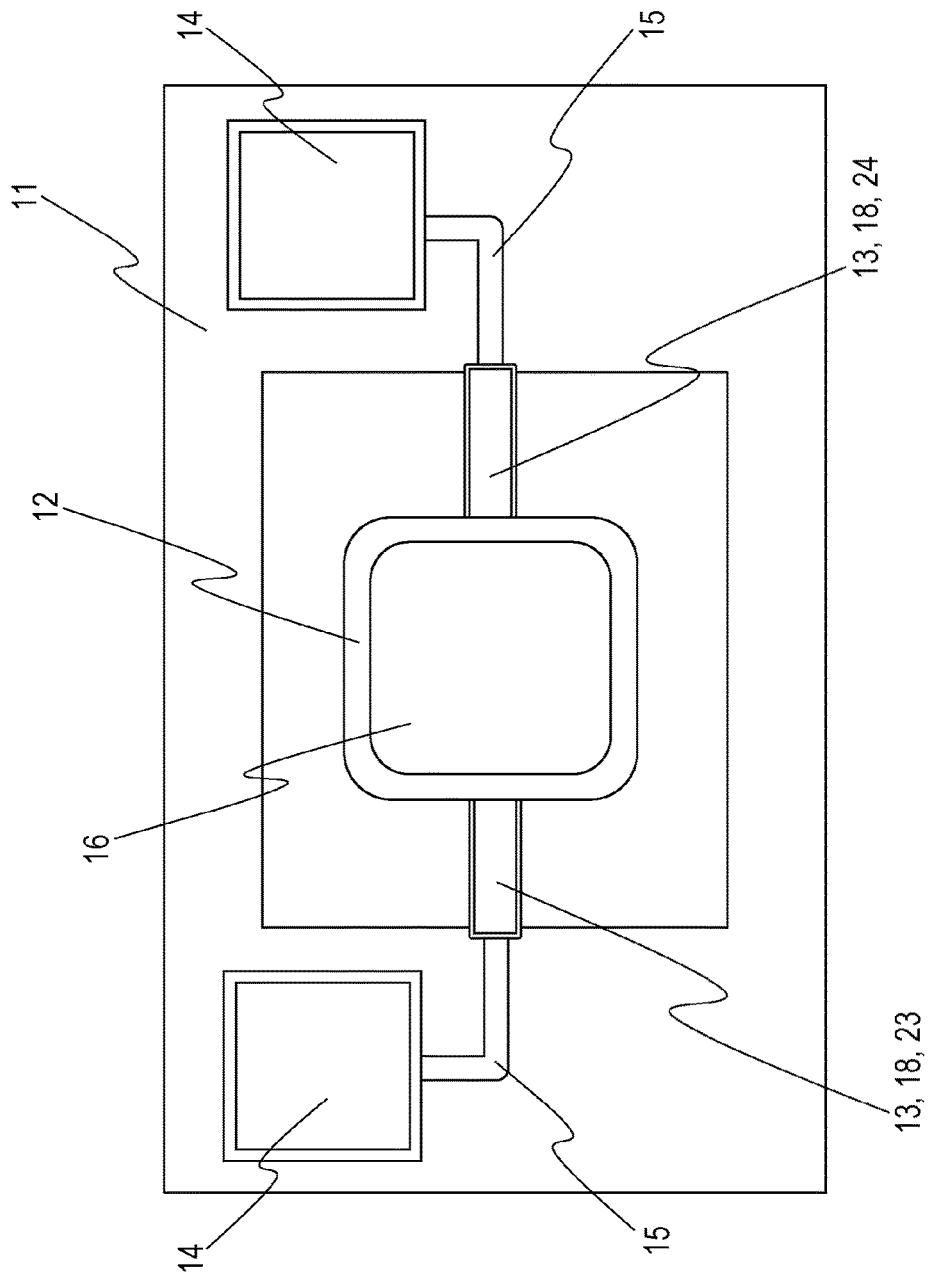

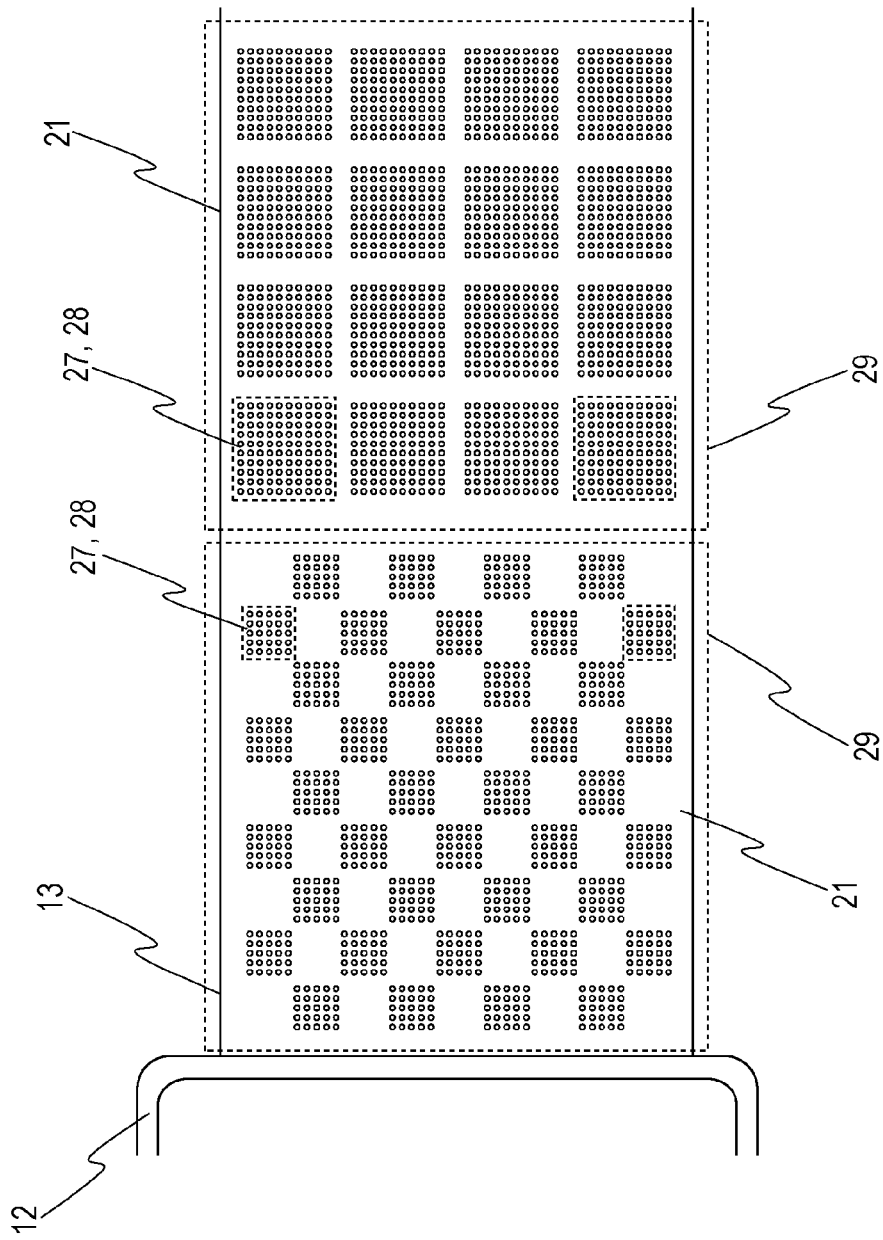

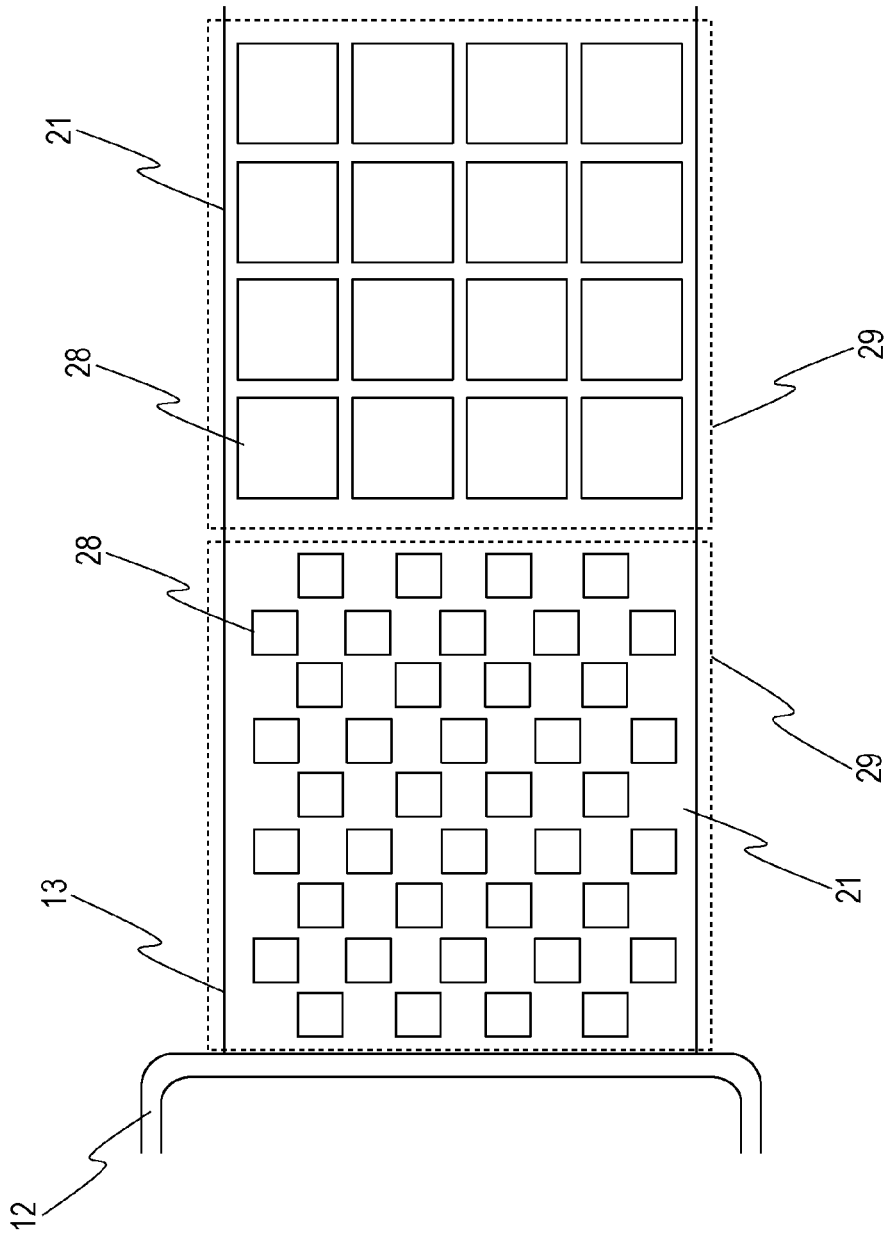

INFRARED SENSOR

BACKGROUND

1. Technical Field

The present disclosure relates to an infrared sensor on which a phononic crystal structure is mounted.

2. Description of the Related Art

In conventional thermal infrared sensors, a structure has been proposed where an infrared receiver is disposed with a space from a base substrate via a beam, as described in Patent Literature 1. This structure aims at insulating the infrared receiver from the base substrate thermally, and infrared receiver sensitivity improves as thermal insulation performance of the beam increases. As described in Patent Literature 1, using porous materials such as aerogel as a beam allows improvement in thermal insulation performance. However, a simple porous structure without order only leads to reduction in thermal conductance as porosity increases, providing limited thermal insulation performance.

Meanwhile, Non-Patent Literature 1 or Patent Literature 2 discloses that introduction of through holes or pillar-shaped resonators that form periodic lines on the order of nanometers (in a range from 1 nm to 1000 nm) into a thin-film substance allows reduction in thermal conductivity of a base material that constitutes the thin film. Such a substance is referred to as a phononic crystal. Because of the reduction in thermal conductivity itself of the constituent material, this provides a thermal insulation effect greater than reduction in thermal conductance resulting from introduction of porosity as compared with the simple porous structure.

The following describes a mechanism by which the phononic crystal controls thermal conduction. In an insulator or semiconductor, heat is mainly carried by lattice vibration called phonon. Dispersion relation of phonon (relation between frequency and wave number, or band structure) is determined for each material. Thermal conductivity of an insulator or semiconductor is determined by phonon dispersion relation. In particular, a heat-carrying phonon ranges in a wide frequency band from 100 GHz to 10 THz, and the phonon corresponding to this band determines a thermal conduction characteristic of the material. The frequency band of the heat-carrying phonon is defined here as a heat band. In a phononic crystal, introduction of a periodic structure allows artificial control of original phonon dispersion of the material, allowing control of thermal conductivity itself of the material. In particular, examples of variation that affects thermal insulation performance in a dispersion curve include formation of a phononic band gap (PBG). When the PBG can be formed in the heat band, phonons inside the PBG cannot exist and will not contribute to thermal conduction. As a result, thermal conductivity can be reduced.

Introduction of such a phononic crystal structure into the beam of the infrared receiver allows improvement in sensitivity of the infrared sensor.

CITATION LIST

Patent Literature

PTL 1: Unexamined Japanese Patent Publication No. 2012-063359
PTL 2: U.S. Patent Publication No. 2015/0015930

Non-Patent Literature

NPL 1: Physical Review B 91, 205422 (2015)

Central frequency $\omega_g$ of PBG is dependent on period P of the periodic structure introduced into the phononic crystal ($\omega_g \propto 1/P$). Accordingly, the frequency band of phonon that can eliminate contribution of thermal conduction by PBG is strongly dependent on the period of the phononic crystal. Meanwhile, the heat band varies depending on temperature. For example, the heat band shifts to a high frequency side as the temperature increases, while the heat band shifts to a low frequency side as the temperature decreases. Accordingly, the phononic crystal of single period demonstrates excellent thermal insulation performance only at specified temperature. That is, when the PBG deviates from the heat band as the temperature of the phononic crystal changes, the thermal insulation effect of the phononic crystal is reduced.

When the phononic crystal is used for the beam of the infrared sensor, temperature gradient occurs inside the beam from the infrared receiver toward the base substrate. That is, the temperature becomes higher on an infrared receiver side than on a base substrate side inside the beam. This means that the heat band on an infrared receiver side has relatively high frequency compared with the heat band on a base substrate side. Accordingly, when the beam is made of a phononic crystal of single period, a positional relationship of the heat band and the PBG in a frequency region varies on an infrared receiver side and a base substrate side. Therefore, when the phononic crystal is designed for the temperature on an infrared receiver side, the thermal insulation performance on a base substrate side is reduced, and when the phononic crystal is designed for the temperature on a base substrate side, the thermal insulation performance on an infrared receiver side is reduced. Thus, the beam made of a uniform phononic crystal of single period does not provide sufficient thermal insulation performance throughout the beam.

SUMMARY

One non-limiting and exemplary embodiment provides a technology for improving sensitivity of the thermal infrared sensor.

In one general aspect, the techniques disclosed here feature an infrared sensor configured to space an infrared receiver and a base substrate with a beam made of a thin-film phononic crystal in which through holes are arranged periodically. The beam made of the phononic crystal is configured to increase a period of the through holes at arbitrary intervals in a direction from the infrared receiver toward the base substrate.

The present disclosure provides an excellent thermal insulation effect throughout the beam by performing micro fabrication so as to increase the period of the through holes at arbitrary intervals in the direction from the infrared receiver toward the base substrate inside the beam. As a result, the present disclosure can provide the infrared sensor with excellent sensitivity.

BRIEF DESCRIPTION OF THE DRAWINGS

FIG. 4A is a schematic view of the infrared sensor having a fixed-fixed beam structure according to the first exemplary embodiment when a thermistor scheme is used;

FIG. 5A is an enlarged view near the infrared receiver and the beam according to the first exemplary embodiment of the present disclosure;

FIG. 7 is a plan view for describing a method for manufacturing the infrared sensor according to the first exemplary embodiment of the present disclosure when the thermopile scheme is used;

FIG. 9 is an enlarged view near the infrared receiver and the beam in the infrared sensor according to the third exemplary embodiment of the present disclosure; and FIG. 10 is an enlarged view near the infrared receiver and the beam in the infrared sensor according to the third exemplary embodiment of the present disclosure.

DETAILED DESCRIPTION

Exemplary embodiments of the present disclosure will be described below with reference to the drawings.

First Exemplary Embodiment

Figure 1:
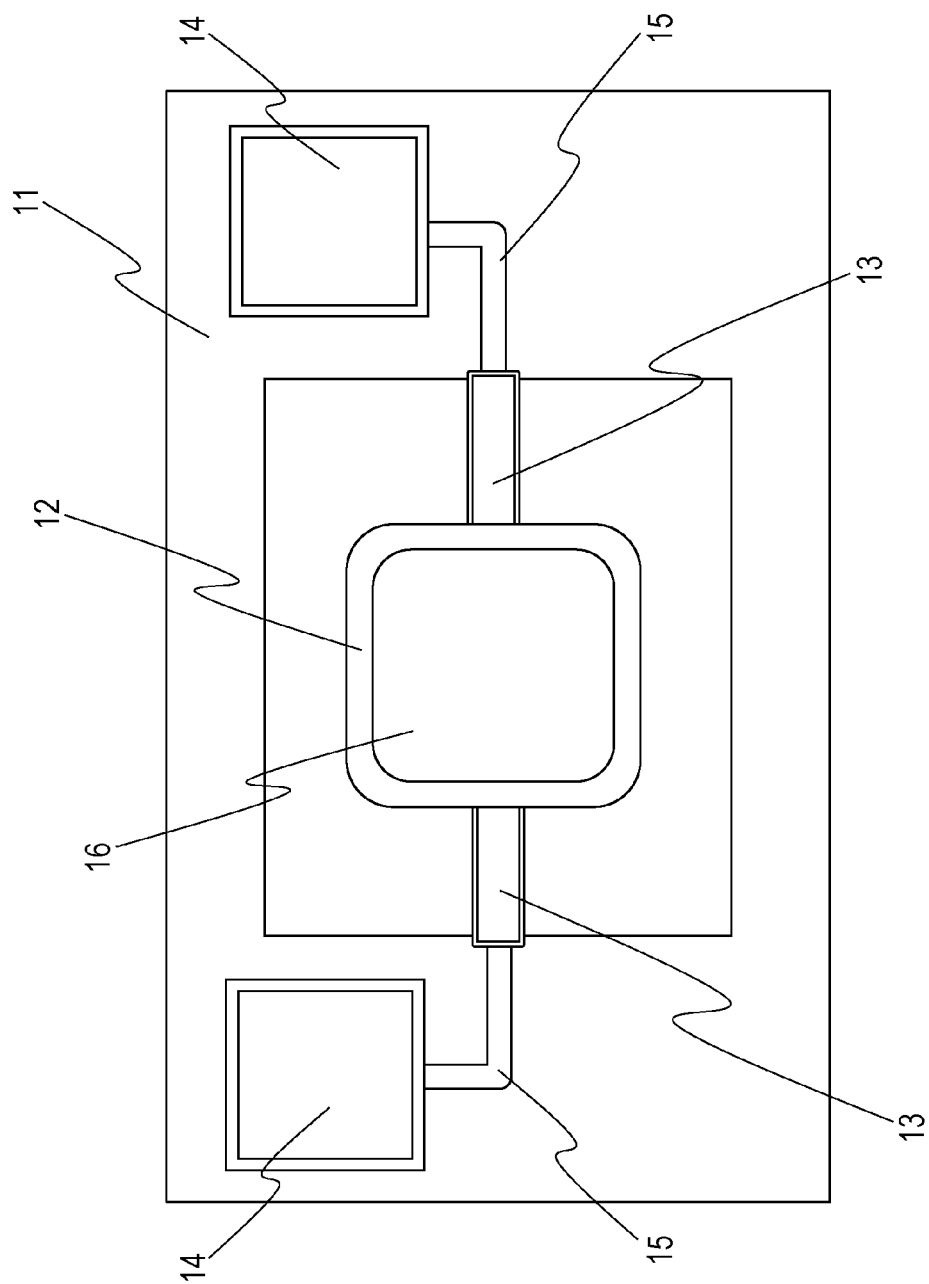
FIG. 1 is a plan view near an infrared receiver in an infrared sensor according to the first exemplary embodiment of the present disclosure.
Figure 2:
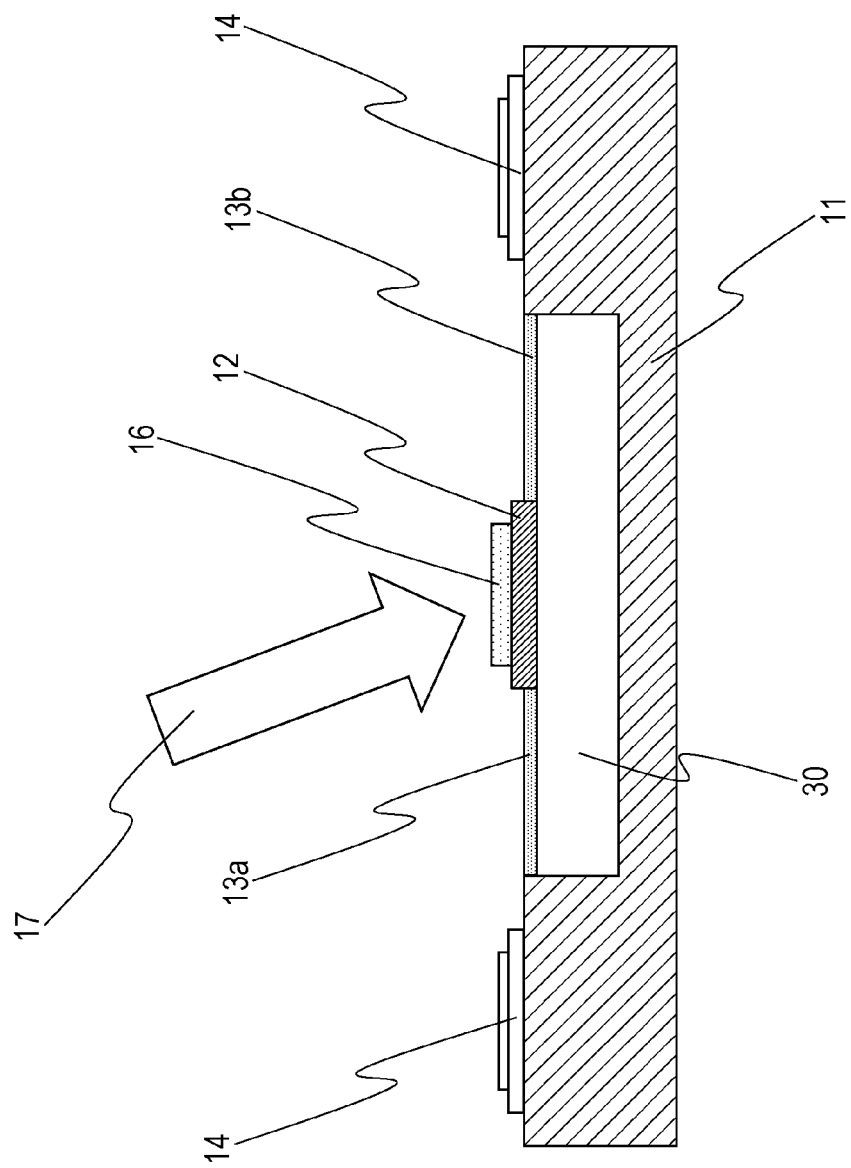
FIG. 2 is a cross-sectional view near the infrared receiver in the infrared sensor according to the first exemplary embodiment of the present disclosure.

FIG. 1 and FIG. 2 respectively illustrate a plan view and a cross-sectional view near an infrared receiver in an infrared sensor according to the first exemplary embodiment of the present disclosure. The infrared sensor of the present disclosure includes infrared receiver 12 installed across a space (that is, recess portion 30, refer to FIG. 2) provided right above base substrate 11 made of a semiconductor such as Si, and first beam 13a and second beam 13b that support infrared receiver 12 in the space. A term "beam 13" can include "first beam 13a" and "second beam 13b".

The infrared sensor of the present disclosure further includes signal processing circuit 14 provided on base substrate 11 and electric wire 15 that transmits an electric signal from infrared receiver 12 to signal processing circuit 14. Infrared absorption layer 16 is also provided in an outermost surface layer of infrared receiver 12.

Figure 3:
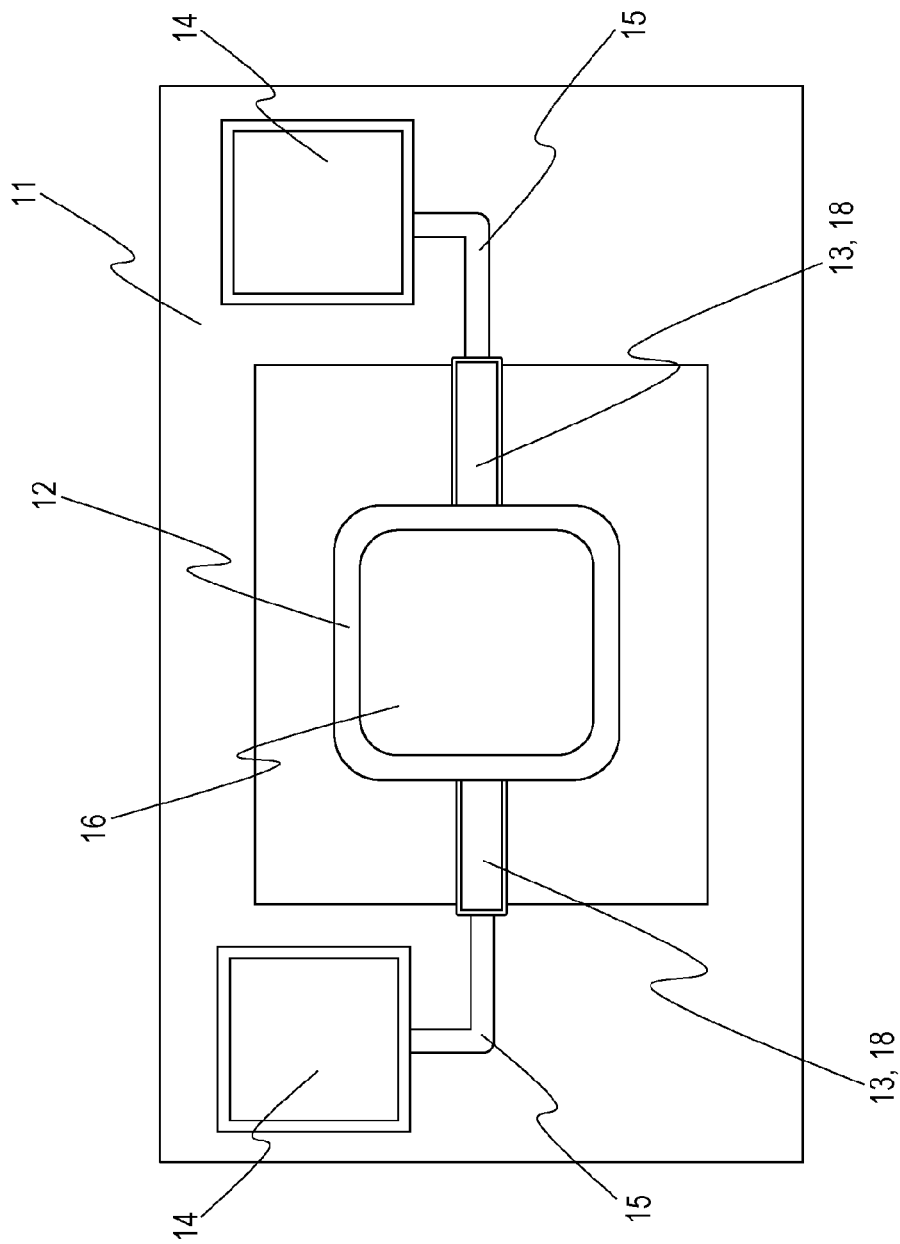
FIG. 3 is a schematic view of the infrared sensor according to the first exemplary embodiment when a thermopile scheme is used.
Figure 4B:
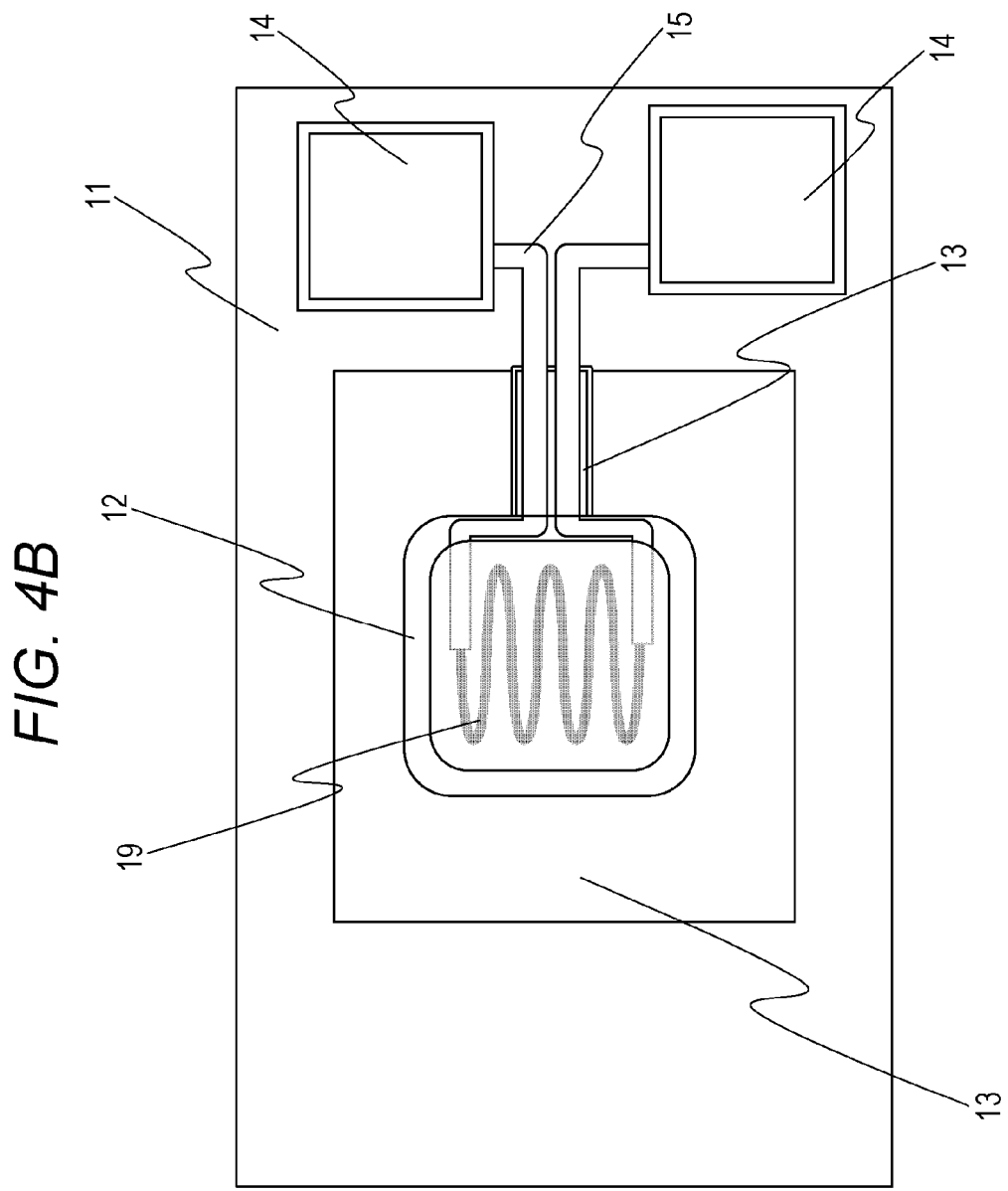
FIG. 4B is a schematic view of the infrared sensor having a cantilever beam structure according to the first exemplary embodiment when the thermistor scheme is used.

An operating principle of the infrared sensor of the present disclosure will be described with reference to FIG. 2. Infrared ray 17 that enters infrared receiver 12 raises temperature of infrared receiver 12. At this time, the temperature of infrared receiver 12 rises as infrared receiver 12 is thermally insulated more strongly from base substrate 11 that serves as a heat bath. A temperature detection scheme of infrared receiver 12 may be a thermopile scheme using the Seebeck effect, or may be a thermistor scheme using resistance change. For the thermopile scheme, as illustrated in FIG. 3, beam 13 itself functions as thermopile 18, an electric signal is transmitted to signal processing circuit 14 through electric wire 15 connected with the beam on base substrate 11, and the temperature or infrared ray intensity is measured. Meanwhile, for the thermistor scheme, as illustrated in FIG. 4A or FIG. 4B, thermistor wire 19 made of a material such as Pt is provided on infrared receiver 12, an electric signal is transmitted through electric wire 15 installed on beam 13 to signal processing circuit 14 formed on base substrate 11, and the temperature or infrared ray intensity is measured. For the thermistor scheme, beam 13 may have a fixed-fixed beam structure as illustrated in FIG. 4A, but may have a cantilever beam structure as illustrated in FIG. 4B. In other words, when thermistor infrared receiver 12 is used, second beam 13b is unnecessary.

Basic structure illustrated in FIG. 3, FIG. 4A, or FIG. 4B is defined as one pixel, and pixels arranged on base substrate 11 enable imaging of a body with finite temperature and measurement of intensity distribution of infrared radiation or a laser beam.

Figure 5B:
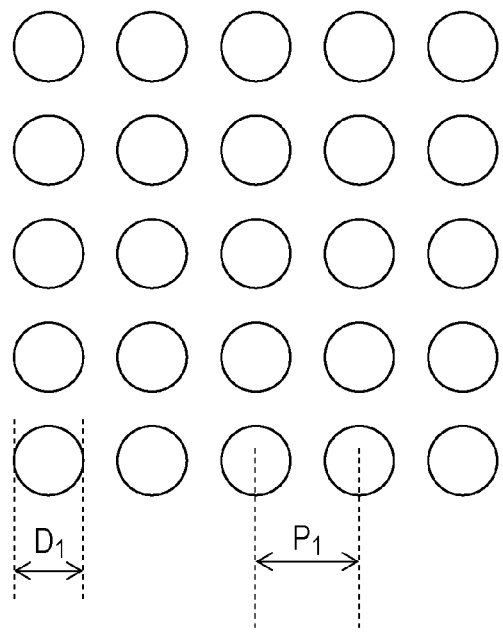
FIG. 5B is one example of an enlarged view of a phononic domain of the beam according to the first exemplary embodiment of the present disclosure.
Figure 5C:
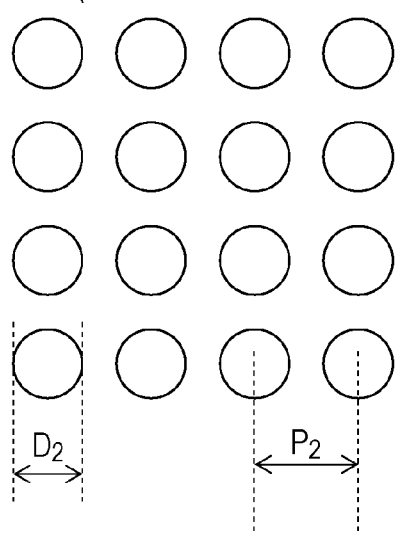
FIG. 5C is one example of the enlarged view of the phononic domain of the beam according to the first exemplary embodiment of the present disclosure.
Figure 5D:
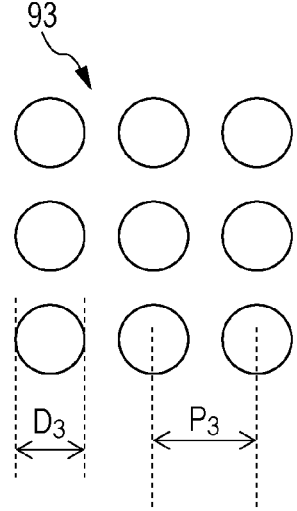
FIG. 5D is one example of the enlarged view of the phononic domain of the beam according to the first exemplary embodiment of the present disclosure.
Figure 6A:
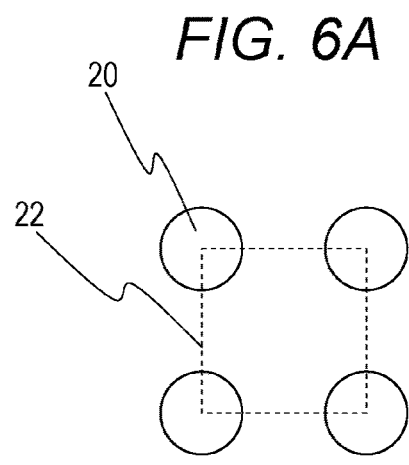
FIG. 6A is a diagram illustrating an example of a unit lattice of a periodic structure that forms a phononic crystal.
Figure 6B:
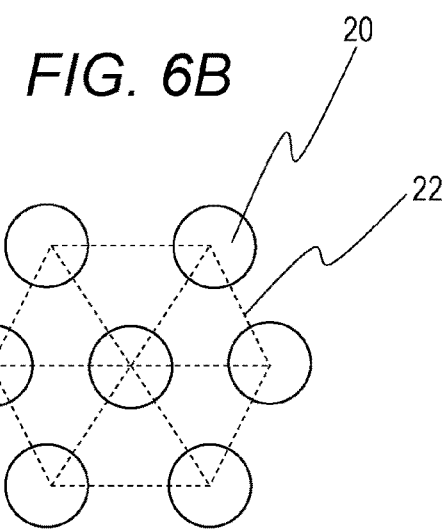
FIG. 6B is a diagram illustrating an example of the unit lattice of the periodic structure that forms the phononic crystal.
Figure 6C:
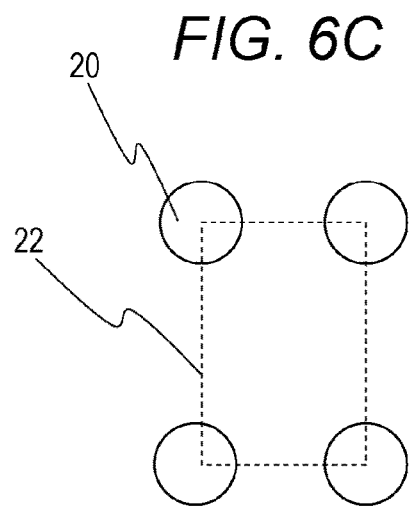
FIG. 6C is a diagram illustrating an example of the unit lattice of the periodic structure that forms the phononic crystal.
Figure 6D:
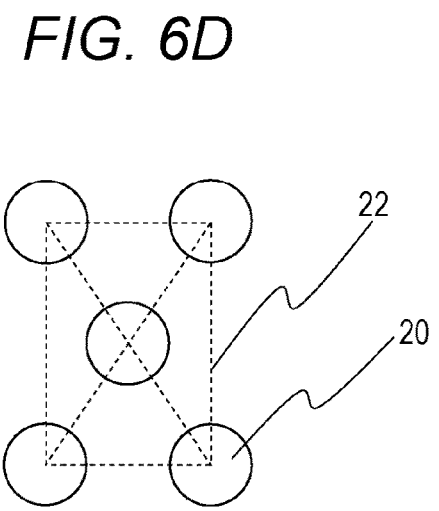
FIG. 6D is a diagram illustrating an example of the unit lattice of the periodic structure that forms the phononic crystal.

Beam 13 of the infrared sensor according to the present disclosure is formed of a two-dimensional phononic crystal which is made of a thin-film substance in thickness ranging from 10 nm to 500 nm and in which through holes 20 with an arbitrary diameter are arranged at arbitrary intervals within a thin-film plane. FIG. 5A illustrates an enlarged plan view including part of infrared receiver 12 and part of beam 13 according to the first exemplary embodiment of the present disclosure. As illustrated in FIG. 5A, beam 13 is not a uniform phononic crystal with single periodicity, but has a structure in which a plurality of phononic domains 21 defined below are arranged. Each of phononic domains 21 corresponds to a region enclosed by a dotted line of FIG. 5A, and refers to a region with a uniform phononic crystal structure inside the region (structure in which through holes are arranged at uniform intervals). FIG. 5A illustrates part of beam 13, and illustrates one example in which three phononic domains 21 constitute beam 13. FIG. 5B, FIG. 5C, and FIG. 5D are each an enlarged view of the periodic structure in each phononic domain. While beam 13 has a uniform periodic structure in each phononic domain, beam 13 has different periodic structures between adjacent phononic domains. As illustrated in FIG. 5A, in beam 13 of the infrared sensor according to the present disclosure, two or more types of phononic domains 21 are arranged at arbitrary intervals so as to increase a period along a direction from an infrared receiver 12 side to a base substrate 11 side. A thermal insulation effect increases as the phononic domains increase in number. This is because phononic domains with different periodic structures have different phonon dispersion, and thus Kapitza resistance is produced by mismatch of phonon group velocity between adjacent phononic domains. Intervals between arranged adjacent phononic domains may be periodic, and may be random.

Period P of the phononic domain in the infrared sensor according to the first exemplary embodiment of the present disclosure is preferably in a range from 1 nm to 300 nm. This is because a wavelength of a heat-carrying phonon ranges mainly from 1 nm to 300 nm.

Diameter D of each through hole of the phononic domain in the infrared sensor according to the first exemplary embodiment of the present disclosure preferably satisfies $D/P \geq 0.5$ with respect to period P. This is because porosity decreases under conditions of $D/P < 0.5$ and excellent thermal insulation performance is not obtained. Here, in order to prevent adjacent through holes from coming into contact with each other, diameter D also needs to satisfy $D/P < 0.9$.

While a circular shape or polygonal shape may be used as an in-plane shape of one phononic domain in the infrared sensor according to the first exemplary embodiment of the present disclosure, an in-plane size preferably satisfies a condition that a length of one side is equal to or greater than 5P and that an area is equal to or greater than $25P^2$ with respect to period P of the periodic structure that constitutes the phononic domain. This is because formation of PBG needs a uniform periodic structure of at least five periods.

Examples of unit lattice 22 that forms the periodic structure of the phononic domain in the infrared sensor according to the first exemplary embodiment of the present disclosure include a tetragonal lattice (FIG. 6A), hexagonal lattice (FIG. 6B), rectangular lattice (FIG. 6C), and face-centered rectangular lattice (FIG. 6D), as illustrated in FIG. 6A to FIG. 6D. One type of unit lattice may constitute each phononic domain throughout the beam, and several types of unit lattice may constitute each phononic domain.

A semiconductor material, not a metal material, preferably forms beam 13 in the infrared sensor according to the first exemplary embodiment of the present disclosure. This is because a heat-carrying medium in metal is not phonons but free electrons. Specifically, beam 13 is preferably formed of a semiconductor made of a single element, such as Si and Ge, a compound semiconductor, such as SiN, SiC, SiGe, GaAs, InAs, InSb, InP, GaN, and AlN, or an oxide semiconductor and insulator, such as $Fe_2O_3$, $VO_2$, $TiO_2$, and $SrTiO_3$.

When thermistor infrared receiver 12 is used, beam 13 can be formed of a semiconductor or insulator. Examples of insulator material include $Al_2O_3$ and $SiO_2$.

The following describes one example of a method for manufacturing the infrared sensor according to the first exemplary embodiment of the present disclosure.

Signal processing circuit 14 is formed on an upper surface of Si base substrate 11. Subsequently, an insulating layer of $SiO_2$ is formed by thermal oxidation so as to cover a surface of base substrate 11. Subsequently, a beam layer is formed on an upper surface of the $SiO_2$ layer by chemical vapor deposition (CVD) or other methods. The beam layer also functions as a layer that forms the infrared receiver. Through holes 20 are formed by electron beam lithography in periodic structure ranging from 100 nm to 300 nm, and by block copolymer lithography in periodic structure ranging from 1 nm to 100 nm. Shapes of infrared receiver 12 and beam 13 are drawn by photolithography, and the beam layer is spatially separated from base substrate 11 by selective etching.

For infrared detection by the thermistor scheme, thermistor 19 made of Pt or other material is formed on infrared receiver 12 by photolithography, spattering process, or other methods. Furthermore, in the following process, infrared absorption layer 16 made of an infrared absorption material, such as gold black, is formed on infrared receiver 12 by photolithography and spattering process. In addition, electric wire 15 is formed on part of beam 13 by photolithography and spattering process, which electrically connects between thermistor 19 formed on a light receiver and signal processing circuit 14 provided on base substrate 11. For the thermistor scheme, when an infrared ray enters infrared receiver 12, signal processing circuit 14 monitors temperature variations of resistance of the thermistor caused by the incoming infrared ray to determine an amount of incoming infrared ray, and thus signal processing circuit 14 functions as an infrared sensor.

Meanwhile, for infrared detection by the thermopile scheme, the semiconductor material that forms beam 13 functions as a thermocouple. In order to cause beam 13 to function as a thermocouple, as illustrated in FIG. 7, on both sides of infrared receiver 12, one beam (that is, first beam 13a) is doped with p-type impurities, whereas another beam (that is, second beam 13b) is doped with n-type impurities. In this case, impurities are doped so as to cause p-type region 23 and n-type region 24 to come into contact with each other on infrared receiver 12. Meanwhile, in a region on a base substrate side of beam 13, impurities are doped so as to cause beam 13 to protrude into part of the base substrate. From the impurities-doped region at an end of beam 13, electric wire 15 made of metal is formed on base substrate 11 by photolithography and spattering process, and electric wire 15 is electrically connected to signal processing circuit 14 formed on base substrate 11. For the thermopile scheme, signal processing circuit 14 monitors a voltage generated between an end of beam 13 doped with n-type impurities and an end of beam 13 doped with p-type impurities to determine an amount of incoming infrared ray, and thus signal processing circuit 14 functions as an infrared sensor. As will become apparent from this description, when thermopile infrared receiver 12 is used, since first beam 13a doped with p-type impurities and second beam 13b doped with n-type impurities are needed, beam 13 is not formed of an insulator. Meanwhile, when thermistor infrared receiver 12 is used, beam 13 does not need second beam 13b, and beam 13 (that is, first beam 13a) can be formed of an insulator.

Second Exemplary Embodiment

Figure 8:
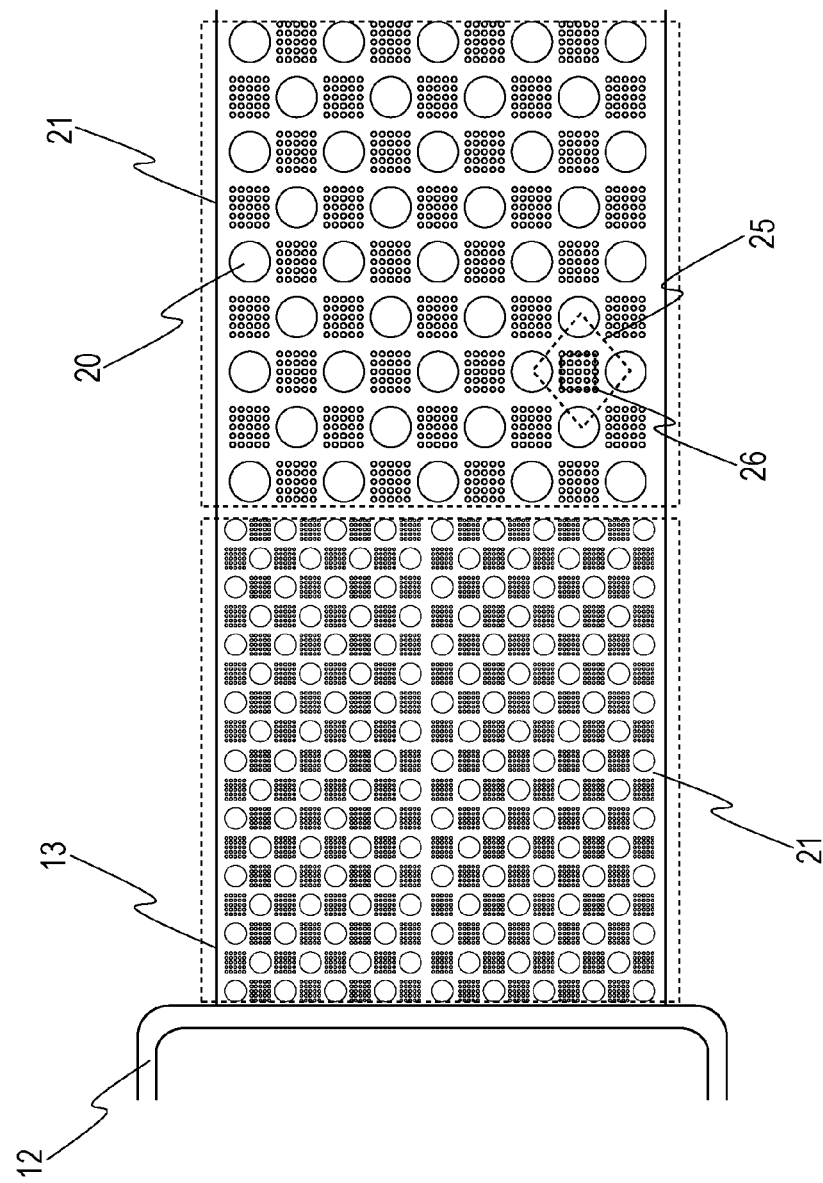
FIG. 8 is an enlarged view near the infrared receiver and the beam in the infrared sensor according to the second exemplary embodiment of the present disclosure.

FIG. 8 illustrates one example of a two-dimensional phononic crystal that forms beam 13 in an infrared sensor according to the second exemplary embodiment of the present disclosure. As in the first exemplary embodiment, the beam of the second exemplary embodiment includes a plurality of phononic domains 21. In a gap between through holes that constitute one periodic structure, each of the phononic domains according to the second exemplary embodiment includes a plurality of periodic structures having layered structures including a new periodic structure different from the above periodic structure. As one example, a phononic domain is formed in multi-periodic structure having layered structures in which, inside a gap of first periodic structure 25 in which through holes 20 of diameter $D_1$ are arranged at period $P_1$, another second periodic structure 26 exists in which through holes 20 of diameter $D_2$ are arranged at period $P_2$. Thus, formation of a plurality of periodic structures in one phononic domain allows formation of a plurality of PBGs at one time. Furthermore, formation of a periodic structure in such a manner that the heat band is located between a plurality of PBGs allows reduction in group velocity of phonon of the heat band by a band end effect, providing an effect of further reduction in thermal conductivity. In the second exemplary embodiment, beam 13 has different periodic structures between adjacent phononic domains, as in the first exemplary embodiment. In beam 13 of the infrared sensor according to the second exemplary embodiment, as illustrated in FIG. 8, two or more types of phononic domains 21 are arranged at arbitrary intervals along a direction from an infrared receiver 12 side to a base substrate 11 side so as to increase a period of either first periodic structure 25 or second periodic structure 26. The thermal insulation effect increases as phononic domains 21 increase in number. This is because phononic domains with different periodic structures have different phonon dispersion, and thus Kapitza resistance is produced by mismatch of phonon group velocity between adjacent phononic domains. Intervals between arranged adjacent phononic domains may be periodic, and may be random.

In FIG. 8, two types of periodic structures are formed in one phononic domain 21, but three or more types of periodic structures may be formed that form phononic domain 21. For example, in a gap of first periodic structures 25 in which through holes having diameter of $D_1$ are arranged at period $P_1$, second periodic structure 26 may exist in which through holes having diameter of $D_2$ are arranged at period $P_2$, and furthermore, another third periodic structure may exist in a gap of the second periodic structures.

Period P of phononic domain 21 in the infrared sensor according to the second exemplary embodiment of the present disclosure is preferably in a range from 1 nm to 300 nm. This is because a wavelength of the heat-carrying phonon ranges mainly from 1 nm to 300 nm.

When definitions are established such that a first periodic structure is a periodic structure having the greatest period inside phononic domain 21 in the infrared sensor according to the second exemplary embodiment of the present disclosure and that a second periodic structure is a periodic structure arranged in a gap of the first periodic structure, the gap between the adjacent through holes in the first periodic structure needs to be equal to or larger than five periods of the through holes of the second periodic structure. Period $P_1$ of the first periodic structure and period $P_2$ of the second periodic structure preferably satisfy a relationship of $P_1/P_2 \geq 10$. This is because, while the heat band is widely distributed in a frequency band different by about three orders of magnitude, a center frequency of the PBG formed by the first periodic structure and a center frequency of the PBG formed by the second periodic structure need to be designed to be different by 10 times or more. When the center frequencies of both PBGs are close to each other, an effect of multi-periodic structure is reduced. As long as the above relationship is satisfied, a relationship D/P of the diameter and the period of the through holes in the first periodic structure and the second periodic structure may be designed in any way. It is necessary to appropriately set D/P so as to prevent adjacent through holes from coming into contact with each other.

While a circular shape or polygonal shape may be used as an in-plane shape of phononic domain 21 in the infrared sensor according to the second exemplary embodiment of the present disclosure, when the periodic structure having the maximum period in the phononic domain is defined as the first periodic structure, an in-plane size preferably satisfies a condition that a length of one side is equal to or greater than $5P_1$ and that an area is equal to or greater than $25P_1^2$ with respect to period $P_1$ of the first periodic structure. This is because formation of PBG needs a uniform periodic structure of at least five periods.

Examples of unit lattice that forms the periodic structure of the phononic domain in the infrared sensor according to the second exemplary embodiment of the present disclosure include a tetragonal lattice (FIG. 6A), hexagonal lattice (FIG. 6B), rectangular lattice (FIG. 6C), and face-centered rectangular lattice (FIG. 6D), as illustrated in FIG. 6A to FIG. 6D. One type of unit lattice may constitute each phononic domain throughout the beam, and several types of unit lattice may constitute each phononic domain.

The infrared sensor according to the second exemplary embodiment of the present disclosure can be manufactured by the same method as the method for manufacturing the infrared sensor according to the first exemplary embodiment.

Third Exemplary Embodiment

FIG. 9 illustrates one example of a two-dimensional phononic crystal that forms beam 13 in an infrared sensor according to the third exemplary embodiment of the present disclosure. As in the first exemplary embodiment, beam 13 of the third exemplary embodiment includes a plurality of phononic domains. Each of phononic domains 21 according to the third exemplary embodiment is formed in which a plurality of micro periodic structures 27 are arranged in which through holes 20 having diameter $D_1$ are arranged at period $P_1$. Each of micro periodic structures 27 is defined as subphononic domain 28. Subphononic domains 28 that constitute one phononic domain 21 have a uniform shape and are arranged at intervals of period $P_m$ to form macro periodic structure 29. The shape of subphononic domain 28 may be circular or rectangular as long as the shape is uniform. When a length of one side of the subphononic domain is sufficiently smaller than the overall shape of subphononic domain 28, for long-wavelength phonons, one subphononic domain 28 functions as one large through hole, as illustrated in a schematic view of FIG. 10. Therefore, subphononic domain 28 demonstrates thermal insulation performance as a phononic crystal for long-wavelength phonons. In contrast, for short-wavelength phonons, micro periodic structure 27 inside subphononic domain 28 demonstrates thermal insulation performance. Accordingly, period $P_1$ of the through hole that constitutes micro periodic structure 27 according to the third exemplary embodiment of the present disclosure needs to satisfy $P_1/L_s \leq 0.1$ with respect to length $L_s$ of one side of the subphononic domain. This is because, when $P_1/L_s > 0.1$, long-wavelength phonons are scattered by the micro periodic structure and subphononic domain 28 does not function as a phononic crystal.

Thus, formation of a plurality of periodic structures in one phononic domain allows formation of a plurality of PBGs at one time. Formation of the periodic structures in such a manner that the heat band is located between a plurality of PBGs allows reduction in group velocity of phonon of the heat band by a band end effect, providing an effect of further reduction in thermal conductivity. In the third exemplary embodiment, beam 13 has different periodic structures between adjacent phononic domains, as in the first exemplary embodiment. In beam 13 of the infrared sensor according to the third exemplary embodiment, as illustrated in FIG. 9, two or more types of phononic domains are arranged at arbitrary intervals along a direction from an infrared receiver 12 side to a base substrate 11 side so as to increase a period of either micro periodic structure 27 or macro periodic structure 29. The thermal insulation effect increases as phononic domains 21 increase in number. This is because phononic domains with different periodic structures have different phonon dispersion, and thus Kapitza resistance is produced by mismatch of phonon group velocity between adjacent phononic domains. Intervals between arranged adjacent phononic domains may be periodic, and may be random.

Period $P_s$ of micro periodic structures 27 of subphononic domain 28 in the infrared sensor according to the third exemplary embodiment of the present disclosure is preferably in a range from 1 nm to 30 nm. Meanwhile, period $P_m$ of macro periodic structure 29 constituted by subphononic domain 28 is preferably in a range from 10 nm to 300 nm corresponding to the period of micro periodic structure 27.

In micro periodic structure 27 that constitutes subphononic domain 28, it is necessary that the through holes are aligned for five periods or more. This condition also applies to macro periodic structure 29 constituted by phononic domain 21.

A circular shape or polygonal shape may be used as an in-plane shape of phononic domain 21 in the infrared sensor according to the third exemplary embodiment of the present disclosure. An in-plane size of the phononic domain according to the third exemplary embodiment of the present disclosure preferably satisfies a condition that a length of one side is equal to or greater than $5P_m$, and that an area is equal to or greater than $25P_m^2$ with respect to period $P_m$ of macro periodic structure 29 constituted by phononic domain 21. This is because formation of PBG needs a uniform periodic structure of at least five periods.

Examples of unit lattice that forms the macro periodic structure and the micro periodic structure in the infrared sensor according to the third exemplary embodiment of the present disclosure include a tetragonal lattice (FIG. 6A), hexagonal lattice (FIG. 6B), rectangular lattice (FIG. 6C), and face-centered rectangular lattice (FIG. 6D), as illustrated in FIG. 6A to FIG. 6D. One type of unit lattice may constitute each phononic domain throughout the beam, and several types of unit lattice may constitute each phononic domain.

The infrared sensor according to the third exemplary embodiment of the present disclosure can be manufactured by the same method as the method for manufacturing the infrared sensor according to the first exemplary embodiment.

The present disclosure provides excellent thermal insulation effect throughout the beam by performing micro fabrication so as to increase the period of the through holes at arbitrary intervals in the direction from the infrared receiver toward the base substrate inside the beam. As a result, the present disclosure can provide the infrared sensor with excellent sensitivity.

REFERENCE SIGNS LIST 11 base substrate
12 infrared receiver
13 beam
14 signal processing circuit
15 electric wire
16 infrared absorption layer
17 infrared ray
18 thermopile
19 thermistor wire
20 through hole
21 phononic domain
22 unit lattice
23 p-type semiconductor
24 n-type semiconductor
25 first periodic structure
26 second periodic structure
27 micro periodic structure
28 subphononic domain
29 macro periodic structure

What is claimed is:

1. An infrared sensor comprising:
a base substrate comprising a recess portion;
a thermopile infrared receiver;
a first beam; and
a second beam, wherein:
one end of the first beam is connected to the infrared receiver,
other end of the first beam is connected to the base substrate,
one end of the second beam is connected to the infrared receiver,
other end of the second beam is connected to the base substrate,
the recess portion is located between the infrared receiver and the base substrate in a cross-sectional view in such a manner that the infrared receiver is suspended above the base substrate,
the recess portion is located between the first beam and the base substrate in a cross-sectional view in such a manner that the first beam is suspended above the base substrate,
the recess portion is located between the second beam and the base substrate in a cross-sectional view in such a manner that the second beam is suspended above the base substrate,
the first beam includes a p-type first domain, a p-type second domain, and a p-type third domain,
the p-type first domain is located between the p-type second domain and the infrared receiver in a plan view,
the p-type first domain is formed of a phononic crystal comprising through holes arranged regularly at a period $p1_p$,
the p-type second domain is located between the p-type first domain and the p-type third domain in the plan view,
the p-type second domain is formed of a phononic crystal comprising through holes arranged regularly at a period $p2_p$,
the p-type third domain is located between the p-type second domain and the base substrate in the plan view,
the p-type third domain is formed of a phononic crystal comprising through holes arranged regularly at a period $p3_p$,
a value of the period $p2_p$ is greater than a value of the period $p1_p$,
a value of the period $p3_p$ is greater than a value of the period $p2_p$,
the second beam includes an n-type first domain, an n-type second domain, and an n-type third domain,
the n-type first domain is located between the n-type second domain and the infrared receiver in the plan view,
the n-type first domain is formed of a phononic crystal comprising through holes arranged regularly at a period $p1_n$,
the n-type second domain is located between the n-type first domain and the n-type third domain,
the n-type second domain is formed of a phononic crystal comprising through holes arranged regularly at a period $p2_n$,
the n-type third domain is located between the n-type second domain and the base substrate in the plan view,
the n-type third domain is formed of a phononic crystal comprising through holes arranged regularly at a period $p3_n$, a value of the period $p2_n$ is greater than a value of the period $p1_n$, and a value of the period $p3_n$ is greater than a value of the period $p2_n$.

2. The infrared sensor according to claim 1, further comprising:
   a first electric wire electrically connected to the first beam;
   a second electric wire electrically connected to the second beam;
   a first electrode electrically connected to the first electric wire; and
   a second electrode electrically connected to the second electric wire.

3. An infrared sensor comprising:
   a base substrate comprising a recess portion;
   a thermistor infrared receiver;
   a first beam;
   a first electric wire electrically connected to the infrared receiver;
   a second electric wire electrically connected to the infrared receiver;
   a first electrode electrically connected to the first electric wire; and
   a second electrode electrically connected to the second electric wire, wherein:
   one end of the first beam is connected to the infrared receiver,
   other end of the first beam is connected to the base substrate,
   the recess portion is located between the infrared receiver and the base substrate in a cross-sectional view in such a manner that the infrared receiver is suspended above the base substrate,
   the recess portion is located between the first beam and the base substrate in a cross-sectional view in such a manner that the first beam is suspended above the base substrate,
   the first beam includes a first domain, a second domain, and a third domain,
   the first domain is located between the second domain and the infrared receiver in a plan view,
   the first domain is formed of a phononic crystal comprising through holes arranged regularly at a period p1,
   the second domain is located between the first domain and the third domain in the plan view,
   the second domain is formed of a phononic crystal comprising through holes arranged regularly at a period p2,
   the third domain is located between the second domain and the base substrate in the plan view,
   the third domain is formed of a phononic crystal comprising through holes arranged regularly at a period p3, and
   a value of the period p2 is greater than a value of the period p1, and
   a value of the period p3 is greater than a value of the period p2.

4. The infrared sensor according to claim 3, further comprising a second beam, wherein:
   one end of the second beam is connected to the infrared receiver,
   other end of the second beam is connected to the base substrate,
   the recess portion is located between the second beam and the base substrate in a cross-sectional view in such a manner that the second beam is suspended above the base substrate,
   the second beam includes a fourth domain and a fifth domain each formed of a phononic crystal,
   the fourth domain is located between the fifth domain and the infrared receiver in a plan view,
   the fourth domain is formed of a phononic crystal comprising through holes arranged regularly at a period p4,
   the fifth domain is formed of a phononic crystal comprising through holes arranged regularly at a period p5, and
   a value of the period p5 is greater than a value of the period p4.

5. The infrared sensor according to claim 4, wherein
   the first electric wire is in contact with a surface of the first beam, and
   the second electric wire is in contact with a surface of the second beam.

6. The infrared sensor according to claim 3, wherein
   the first electric wire and the second electric wire are in contact with a surface of the first beam.

7. An infrared sensor comprising:
   a base substrate comprising a recess portion;
   a thermistor infrared receiver;
   a first beam;
   a second beam;
   a first electric wire electrically connected to the infrared receiver;
   a second electric wire electrically connected to the infrared receiver;
   a first electrode electrically connected to the first electric wire; and
   a second electrode electrically connected to the second electric wire, wherein:
   one end of the first beam is connected to the infrared receiver,
   other end of the first beam is connected to the base substrate,
   the recess portion is located between the infrared receiver and the base substrate in a cross-sectional view in such a manner that the infrared receiver is suspended above the base substrate,
   the recess portion is located between the first beam and the base substrate in a cross-sectional view in such a manner that the first beam is suspended above the base substrate,
   the first beam consists only of a first domain and a second domain,
   the first domain is located between the second domain and the infrared receiver in a plan view,
   the first domain is formed of a phononic crystal comprising through holes arranged regularly at a period p1,
   the second domain is formed of a phononic crystal comprising through holes arranged regularly at a period p2,
   a value of the period p2 is greater than a value of the period p1,
   one end of the second beam is connected to the infrared receiver,
   other end of the second beam is connected to the base substrate,
   the recess portion is located between the second beam and the base substrate in a cross-sectional view in such a manner that the second beam is suspended above the base substrate, the second beam includes a third domain and a fourth domain each formed of a phononic crystal, the third domain is located between the fourth domain and the infrared receiver in a plan view, the third domain is formed of a phononic crystal comprising through holes arranged regularly at a period p3, the fourth domain is formed of a phononic crystal comprising through holes arranged regularly at a period p4, and a value of the period p4 is greater than a value of the period p3.

8. The infrared sensor according to claim 7, wherein the first electric wire and the second electric wire are in contact with a surface of the first beam.

9. The infrared sensor according to claim 7, wherein:

the first electric wire is in contact with a surface of the first beam, and the second electric wire is in contact with a surface of the second beam.

* * * * *